United States Patent
Hashida (10) Patent No.: US 12,437,940 B2
(45) Date of Patent: Oct. 7, 2025

(54) INPUT DEVICE

(71) Applicant: Alps Alpine Co., Ltd., Tokyo (JP)

(72) Inventor: Junji Hashida, Fukushima-ken (JP)

(73) Assignee: Alps Alpine Co., Ltd, Tokyo (JP)

( * ) Notice: Subject to any disclaimer, the term of this patent is extended or adjusted under 35 U.S.C. 154(b) by 0 days.

(21) Appl. No.: 18/973,604

(22) Filed: Dec. 9, 2024

(65) Prior Publication Data

US 2025/0102724 A1  Mar. 27, 2025

Related U.S. Application Data (63) Continuation of application No. PCT/JP2023/008500, filed on Mar. 7, 2023.

(30) Foreign Application Priority Data

Jun. 29, 2022 (JP) .................. 2022-104958

(51) Int. Cl.
```
H01H 13/83    (2006.01)
F21V 8/00     (2006.01)
G06F 3/02     (2006.01)
H01H 13/02    (2006.01)
```

(52) U.S. Cl.
CPC ............ H01H 13/83 (2013.01); G02B 6/005 (2013.01); G02B 6/0068 (2013.01); G06F 3/02 (2013.01); H01H 13/02 (2013.01); H01H 13/023 (2013.01); *H01H 2013/026* (2013.01)

(58) Field of Classification Search
CPC ......... G02B 6/005; G02B 6/0068; G06F 3/02; H01H 13/02; H01H 13/23; H01H 2013/026
See application file for complete search history.

(56) References Cited

U.S. PATENT DOCUMENTS 8,827,528 B2   9/2014  Takeda et al.
2012/0268379 A1  10/2012  Yoshioka et al.

FOREIGN PATENT DOCUMENTS

| JP | 2008-181862 | 8/2008 |
|----|-------------|--------|
| JP | 4402735     | 1/2010 |
| WO | 2011/080981 | 7/2011 |

OTHER PUBLICATIONS

International Search Report from International Application No. PCT/JP2023/008500 dated May 23, 2023, with English translation.

*Primary Examiner* — Keith G. Delahoussaye
(74) *Attorney, Agent, or Firm* — Beyer Law Group LLP (57) ABSTRACT

An input device includes an input detection unit including a circuit board, an electrostatic electrode on the circuit board for capacitance detection, a light source on the circuit board, a light guide plate provided on the lower side with respect to an operation surface and the upper side with respect to the electrostatic electrode and having a first side surface that faces the light source and a second side surface that does not face the light source, and a frame-shaped light shielding member surrounding the light guide plate and having a light shielding wall in contact with the second side surface. The neighboring first and second side surfaces of the light guide plate form an obtuse angle, the first side surface is perpendicular to upper and lower surfaces of the light guide plate, the second side surface slopes to face downward, and the light shielding wall slopes to face upward.

8 Claims, 12 Drawing Sheets

| DETECTION STATUS | LIGHT EMISSION MODE | TARGET KEY | FIRST LED BLUE | SECOND LED YELLOW |
|---|---|---|---|---|
| NOT DETECTED | NON-LIGHT EMISSION MODE | — | OFF | OFF |
| 35 - 100 mm | FIRST LIGHT EMISSION MODE | ALL | ON | OFF |
| 20 - 35 mm | SECOND LIGHT EMISSION MODE | INPUT-DETECTED KEY | ON | ON |
| 0 - 25 mm (FOR CERTAIN TIME PERIOD) | THIRD LIGHT EMISSION MODE | INPUT-DETECTED KEY | OFF | ON |

INPUT DEVICE

CLAIM OF PRIORITY

This application is a Continuation of International Application No. PCT/JP2023/008500 filed on Mar. 7, 2023, which claims benefit of Japanese Patent Application No. 2022-104958 filed on Jun. 29, 2022. The entire contents of each application noted above are hereby incorporated by reference.

BACKGROUND OF THE INVENTION

1. Field of the Invention

The present invention relates to an input device.

2. Description of the Related Art

Japanese Patent No. 4402735 describes a technology for a key sheet in which light incident on a side surface of a light guide sheet is emitted from a surface of the light guide sheet to illuminate a plurality of keys provided on the surface of the light guide sheet.

However, the technology described in Japanese Patent No. 4402735 is intended for a contact switch in which a push-button moves, and a light source is located outside and, therefore, it is difficult to cause keys to emit light individually. If the technology described in Japanese Patent No. 4402735 is improved to have a configuration such that a non-contact operation performed on each of the keys can be detected by an electrostatic electrode and the keys can emit light individually, the distance between the keys increases, and the keys are not reduced in size. If the keys are simply reduced in size, the following drawbacks may occur. That is, light leakage to neighboring keys through the light guide sheet may occur, the detection accuracy of the non-contact operation performed on the key may deteriorate, and it may be difficult to cause a wide area of the operation surface of the key to emit light with uniform light emission intensity.

SUMMARY OF THE INVENTION

According to one embodiment, an input device includes an input detection unit. The input detection unit includes a circuit board, an electrostatic electrode provided on the circuit board and configured to detect electrostatic capacitance, at least one light source provided on the circuit board, a light guide plate provided on a lower side with respect to an operation surface and on an upper side with respect to the electrostatic electrode and having at least one first side surface that faces the light source and at least one second side surface that does not face the light source, and a light shielding member having a frame shape surrounding the light guide plate and having a light shielding wall that is in contact with the second side surface of the light guide plate. The first side surface and the second side surface of the light guide plate that neighbor each other form an obtuse angle, the first side surface is perpendicular to an upper surface and a lower surface of the light guide plate, the second side surface slopes to face downward, and the light shielding wall of the light shielding member slopes to face upward.

According to one embodiment, the input device is capable of reducing light leakage from the light guide plate in the lateral direction, increasing the detection accuracy of a non-contact operation performed on the operation surface, and causing the operation surface to emit light with uniform light emission intensity over a wide area.

DESCRIPTION OF THE PREFERRED EMBODIMENTS

One embodiment is described below with reference to the accompanying drawings. In the following description, for convenience, the Z-axis direction in the drawings is the up-down direction, the Y-axis direction in the drawings is the right-left direction, and the X-axis direction in the drawings is the front-rear direction. The positive direction of the Z-axis is upwards, the positive direction of the Y-axis is rightward, and the positive direction of the X-axis is frontward.

Overview of Input Detection Unit

Figure 1:
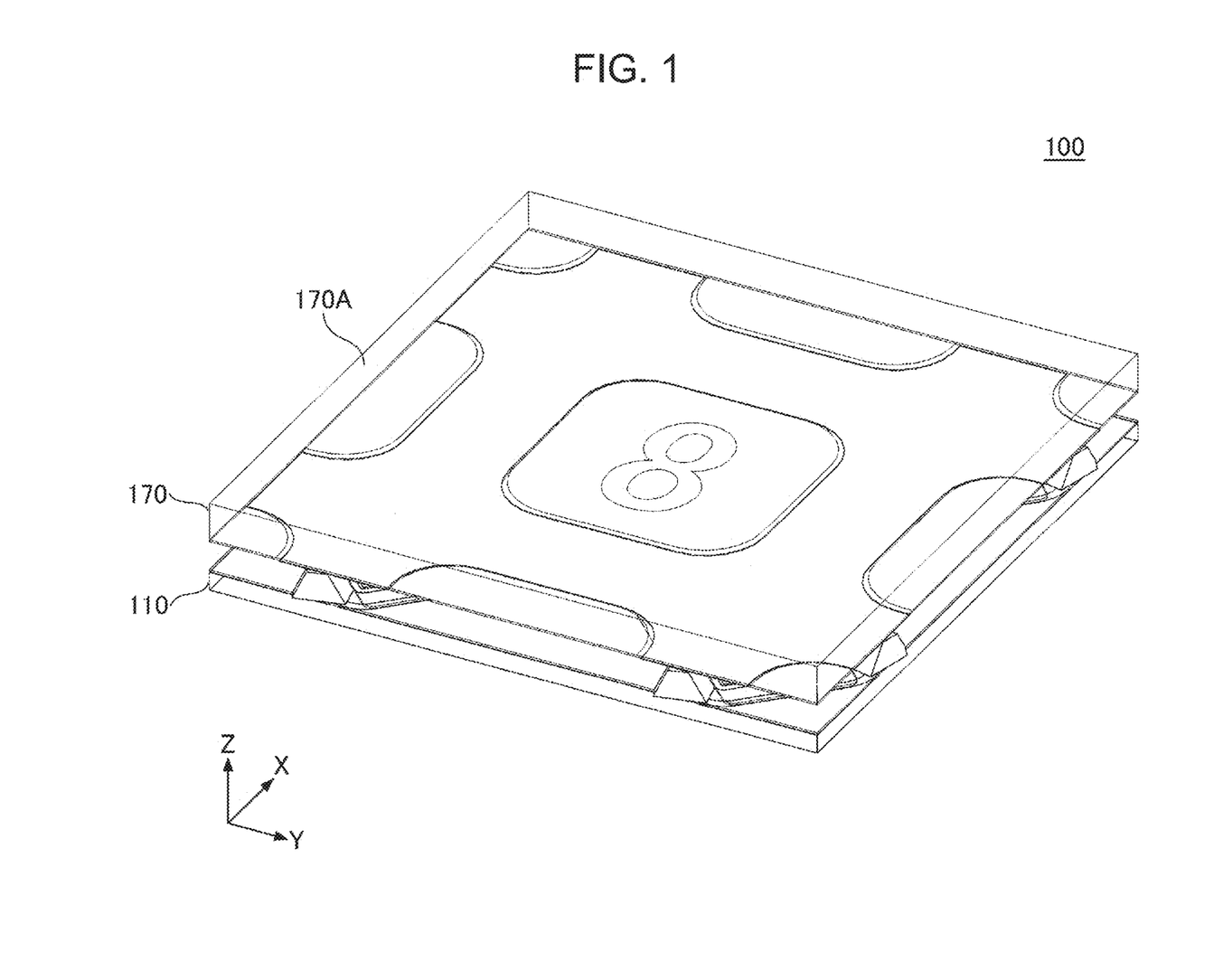
FIG. 1 is an external perspective view of an input detection unit according to one embodiment.

FIG. 1 is an external perspective view of an input detection unit 100 according to one embodiment. As illustrated in FIG. 1, the input detection unit 100 has a rectangular parallelepiped shape that is flat in the up-down direction (the Z-axis direction) as a whole. In particular, according to the present embodiment, the input detection unit 100 has a substantially square shape in plan view from above (in the positive direction of the Z-axis).

The input detection unit 100 has a layered structure with a decorative panel 170 at the top and a circuit board 110 at the bottom. In the input detection unit 100, the upper surface of the decorative panel 170 serves as an operation surface 170A. When a non-contact operation is performed on the operation surface 170A by the operator's finger, the input detection unit 100 can detect the non-contact operation by using an electrostatic electrode 111 (refer to FIG. 2) provided on the circuit board 110.

When the operator's finger moves closer to the operation surface 170A, the input detection unit 100 can cause LEDs 112 (refer to FIG. 2) provided on the circuit board 110 to emit light and, thus, can cause the operation surface 170A to emit light in a predetermined design shape.

The input detection unit 100 is a part of an input device 10 (refer to FIGS. 11 and 12) (a part that constitutes an operation key 11). That is, according to the present embodiment, a part of the input device 10 (a part that constitutes an operation key 11) that is cut in a substantially square shape is referred to as an "input detection unit 100".

Configuration of Input Detection Unit

Figure 2:
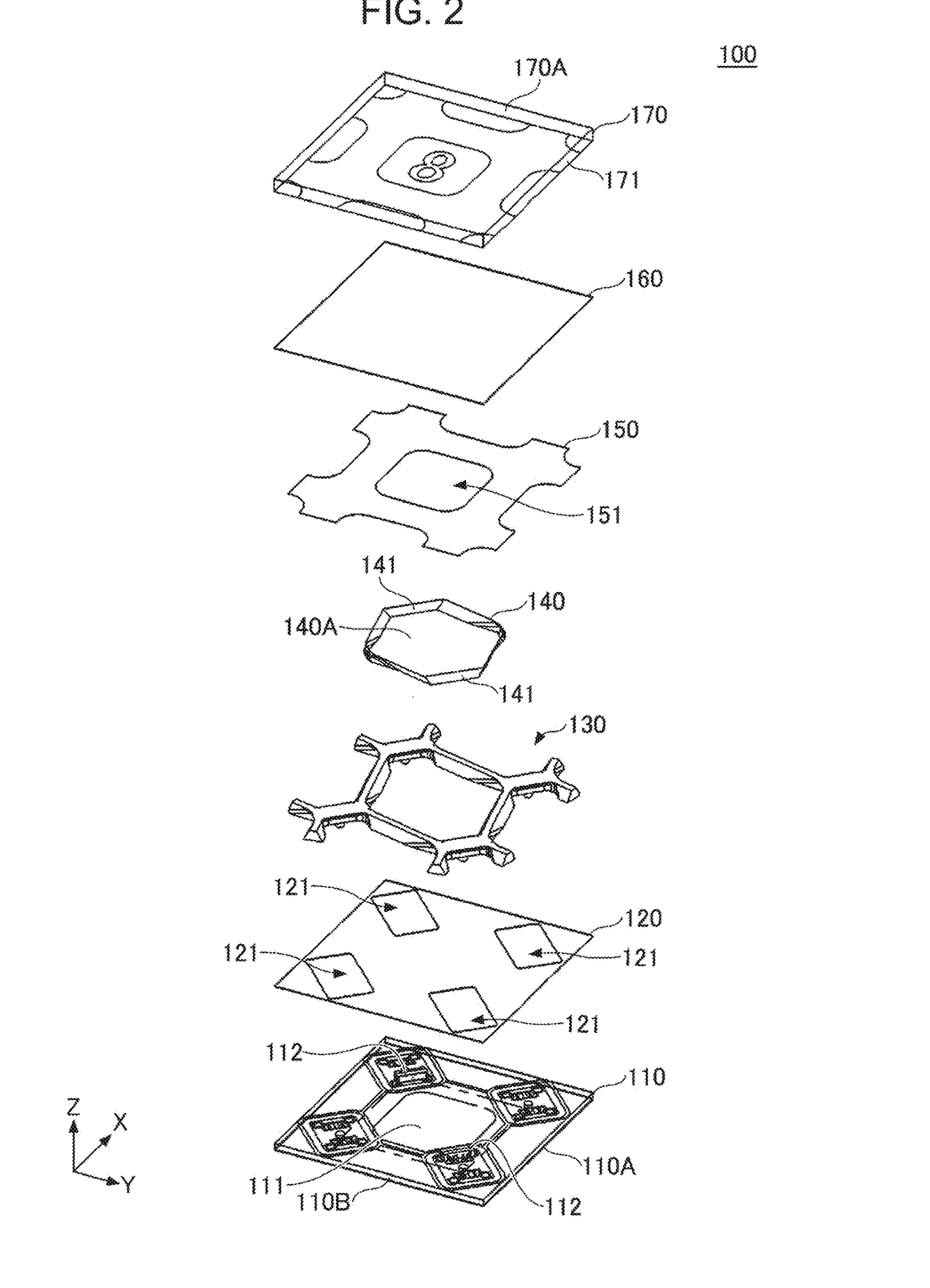
FIG. 2 is an exploded perspective view of the input detection unit according to one embodiment.

FIG. 2 is an exploded perspective view of the input detection unit 100 according to one embodiment. As illustrated in FIG. 2, the input detection unit 100 has, in order from the bottom in FIG. 2 (the negative side of the Z-axis), the circuit board 110, a reflective sheet 120, a light shielding member 130, a light guide plate 140, a light shielding sheet 150, a diffusion sheet 160, and the decorative panel 170.

The circuit board 110 is a flat plate-shaped resin member on which electronic circuits are built. The circuit board 110 has the same shape as the outer shape of the input detection unit 100 (that is, a substantially square shape) in plan view as viewed from above (in the positive direction of the Z-axis).

A substantially square-shaped detection area 110B is provided in the center of an upper surface 110A of the circuit board 110. In the detection area 110B, the electrostatic electrode 111 having substantially the same shape as the detection area 110B is provided to detect electrostatic capacitance.

In the peripheral region of the upper surface 110A of the circuit board 110, each of two of the LEDs 112 (an example of a "light source") is mounted near one of two of corners that face each other. The two LEDs 112 are disposed so as to face a detection area 110B such that the light emission directions face each other.

The reflective sheet 120 is a sheet-like member provided so as to be overlaid on the upper surface 110A of the circuit board 110. The reflective sheet 120 is formed using a material that reflects light emitted from the LED 112. The reflective sheet 120 has the same shape as the outer shape of the input detection unit 100 (that is, a substantially square shape) in plan view as viewed from above (in the positive direction of the Z-axis).

Each of four openings 121 is formed in the vicinity of one of the four corners of the reflective sheet 120. Two of the openings 121 are formed at positions that overlap with the LEDs 112, and the LEDs 112 can be disposed on the upper side (the Z-axis positive side) of the reflective sheet 120 through the openings 121. As a result, the LED 112 can emit light to the light guide plate 140 disposed on the upper side with respect to the reflective sheet 120. The reflective sheet 120 can then reflect the light that leaks from a lower surface 140B of the light guide plate 140 upward (in the positive direction of the Z-axis), thus increasing the intensity of the light emitted from an upper surface 140A of the light guide plate 140.

The light shielding member 130 is provided on the upper side with respect to the reflective sheet 120 at the same height position as the light guide plate 140. The light shielding member 130 is formed using a material that blocks light emitted from the LED 112. The light shielding member 130 has a frame shape surrounding the outer circumferential side surface of the light guide plate 140. According to the present embodiment, because the outer circumferential side surface of the light guide plate 140 forms a hexagonal shape, the light shielding member 130 has a hexagonal frame shape. By surrounding the outer circumferential side surface of the light guide plate 140, the light shielding member 130 can prevent light from leaking out from the light guide plate 140 in the lateral direction.

The light guide plate 140 is provided between the two LEDs 112 on the upper side with respect to the central portion of the reflective sheet 120. The light guide plate 140 is a flat plate-shaped member having translucency. According to the present embodiment, the light guide plate 140 has a hexagonal shape in plan view from above (in the positive direction of the Z-axis). The light guide plate 140 has a pair of first side surfaces 141 facing each other. The light emitted from the LED 112 is incident on the first side surfaces 141 of the light guide plate 140. The light guide plate 140 emits the light incident on the first side surfaces 141 from the upper surface 140A upward (in the positive direction of the Z-axis).

The light shielding sheet 150 is a sheet-like member provided so as to overlap with the light shielding member 130 and the light guide plate 140. The light shielding sheet 150 is formed using a light shielding material. The light shielding sheet 150 has a rectangular opening 151 formed in the central portion (that is, at the portion where the light shielding sheet 150 overlaps the upper surface 140A of the light guide plate 140). This configuration enables the light emitted from the upper surface 140A of the light guide plate 140 to pass upward through the opening 151.

The diffusion sheet 160 is a sheet-like member provided so as to overlap with the light shielding sheet 150. The diffusion sheet 160 is formed by using a material having light diffusing properties. The diffusion sheet 160 can diffuse light that has passed through the opening 151 of the light shielding sheet 150.

The decorative panel 170 is a flat plate-shaped member having translucency and is provided so as to overlap with the diffusion sheet 160. The decorative panel 170 has, on its lower surface, a light shielding portion 171 that has a predetermined design shape and light-shielding property. A portion of the lower surface of the decorative panel 170 where the light shielding portion 171 is not formed enables the light diffused by the diffusion sheet 160 to pass therethrough, causing the operation surface 170A to emit light in a predetermined design shape so that the design shape is visible to an operator.

Configurations of Light Guide Plate and Light Shielding Member

Figure 3:
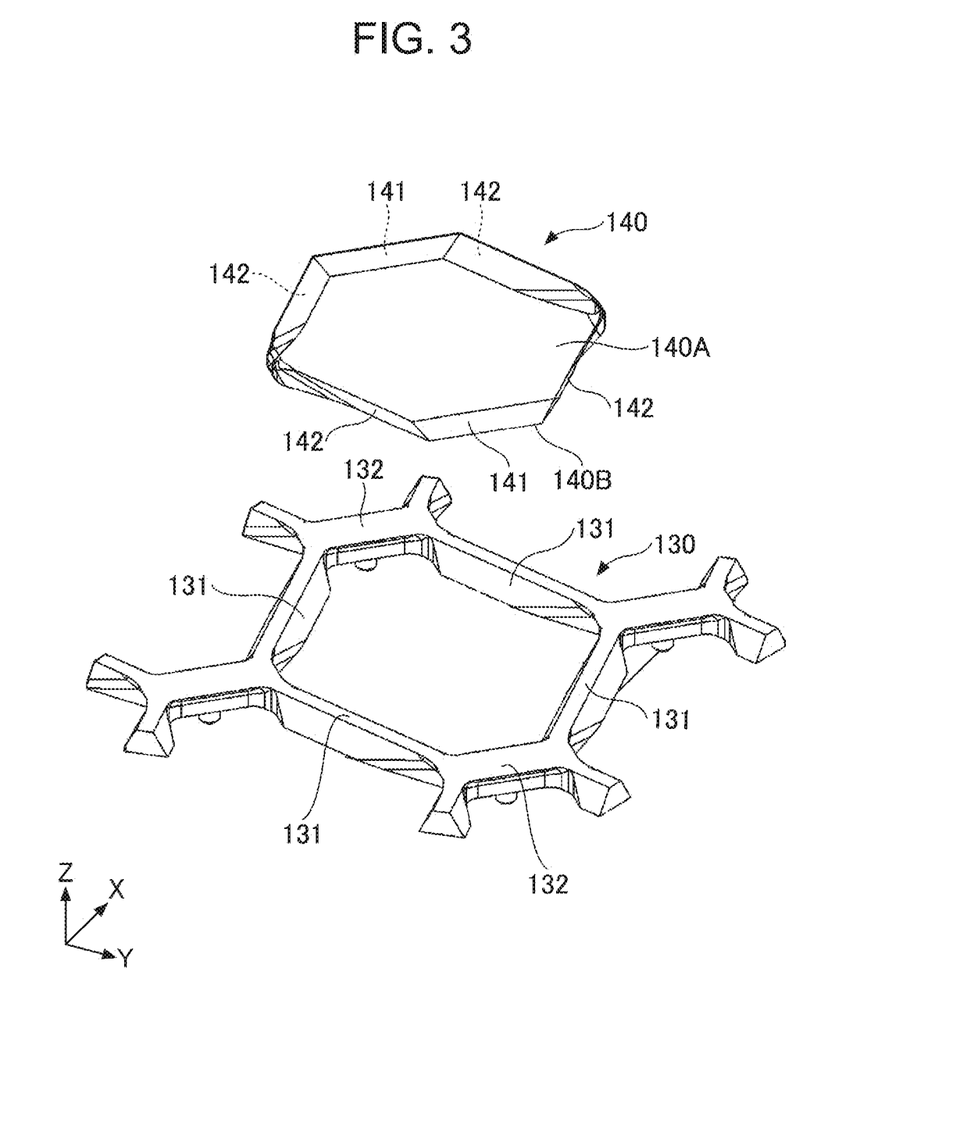
FIG. 3 is an external perspective view of a light guide plate and a light shielding member (that are separated from each other) provided in the input detection unit according to one embodiment.
Figure 4:
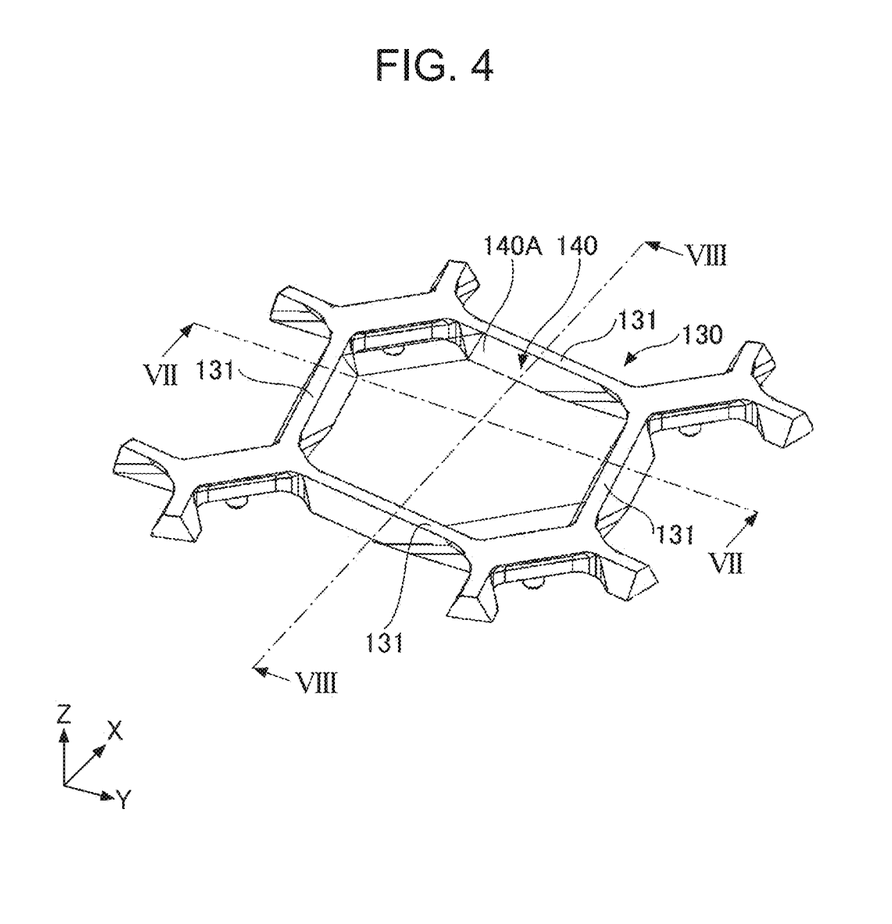
FIG. 4 is an external perspective view of the light guide plate and the light shielding member (that are joined together) provided in the input detection unit according to one embodiment.
Figure 5:
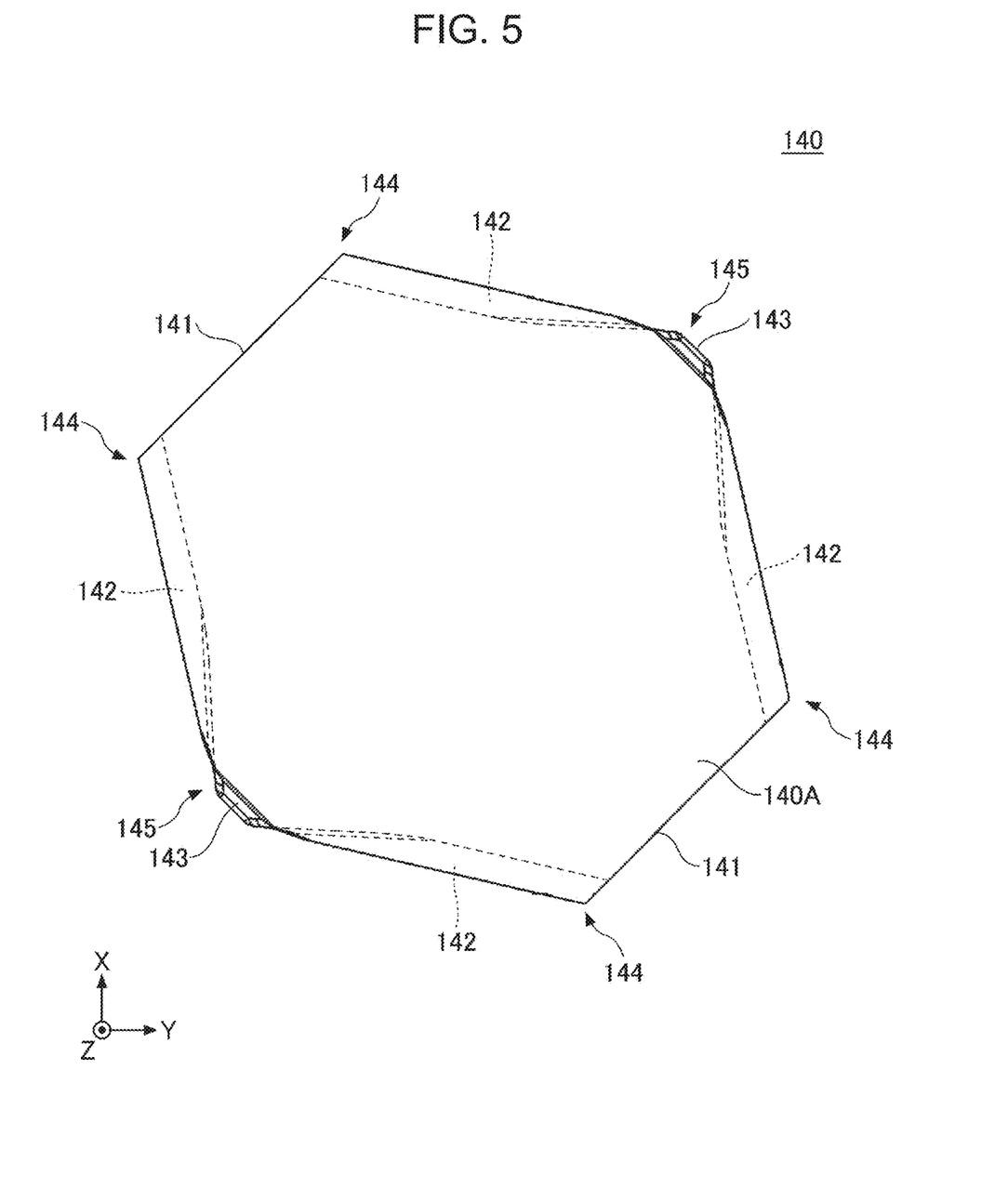
FIG. 5 is a plan view of the light guide plate provided in the input detection unit according to one embodiment.

FIG. 3 is an external perspective view of the light guide plate 140 and the light shielding member 130 (that are separated from each other) provided in the input detection unit 100 according to one embodiment. FIG. 4 is an external perspective view of the light guide plate 140 and the light shielding member 130 (that are joined together) provided in the input detection unit 100 according to one embodiment. FIG. 5 is a plan view of the light guide plate 140 provided in the input detection unit 100 according to one embodiment.

Figure 6:
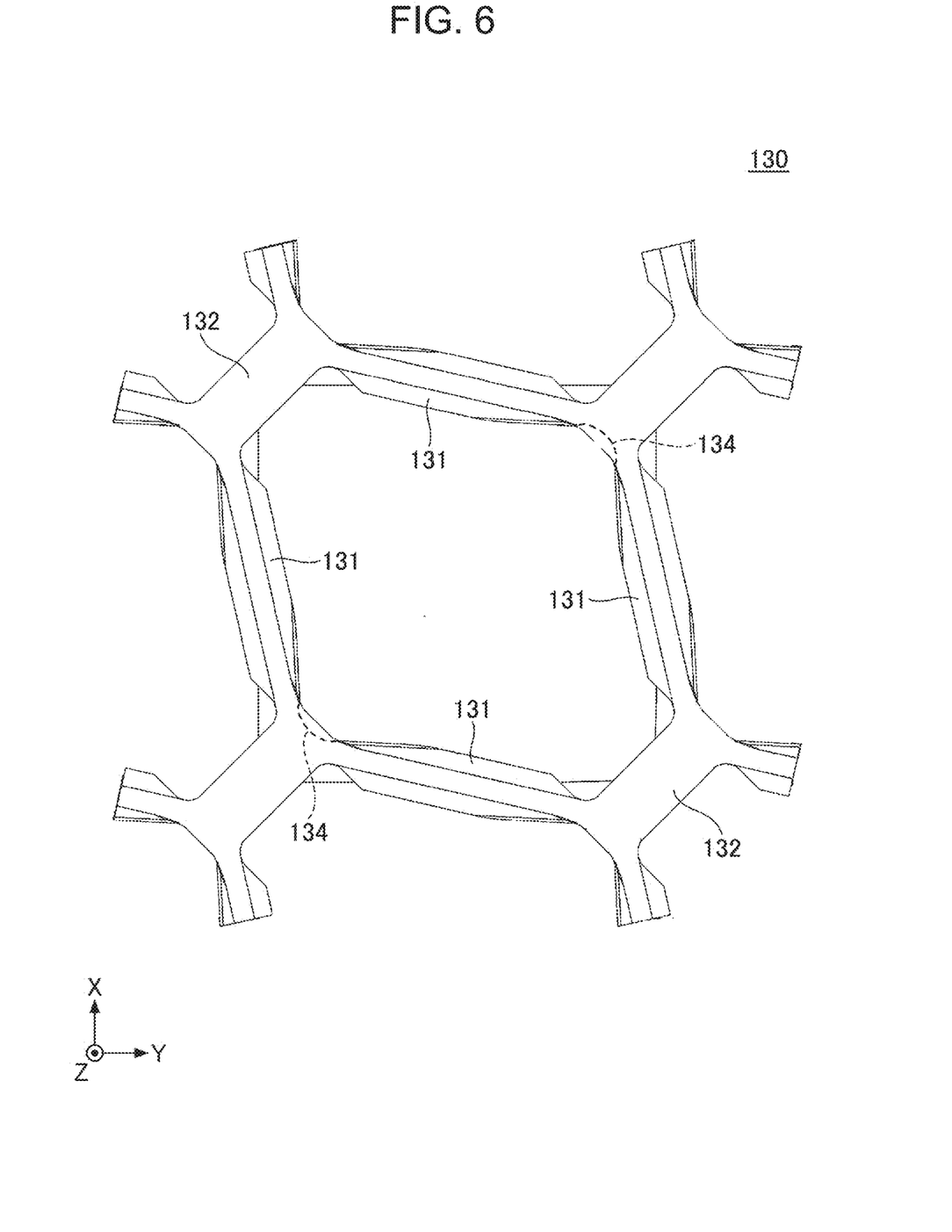
FIG. 6 is a plan view of the light shielding member provided in the input detection unit according to one embodiment.
Figure 7:
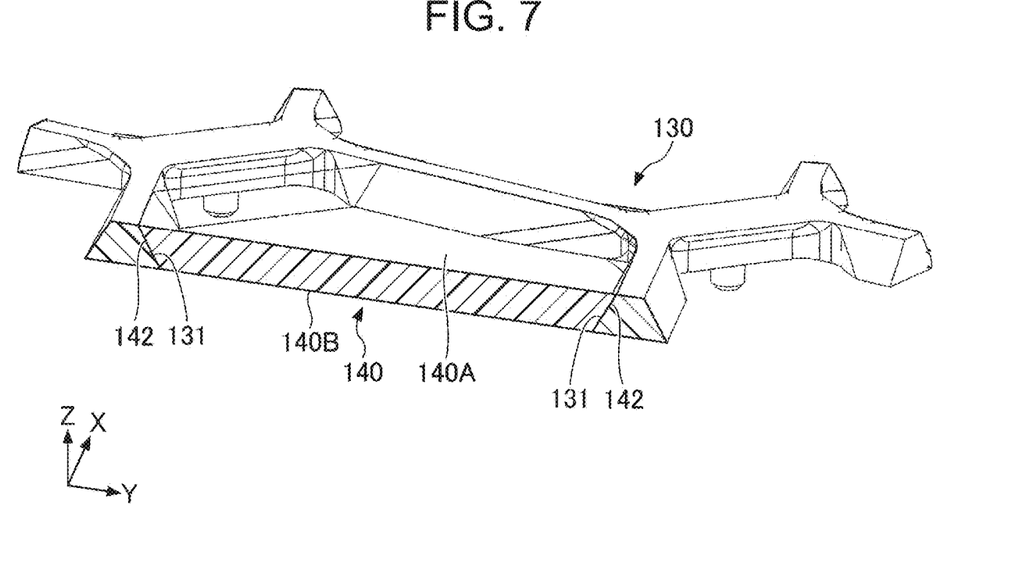
FIG. 7 is a cross-sectional perspective view of the light guide plate and the light shielding member provided in the input detection unit according to one embodiment, taken along a line VII-VII of FIG. 4.
Figure 8:
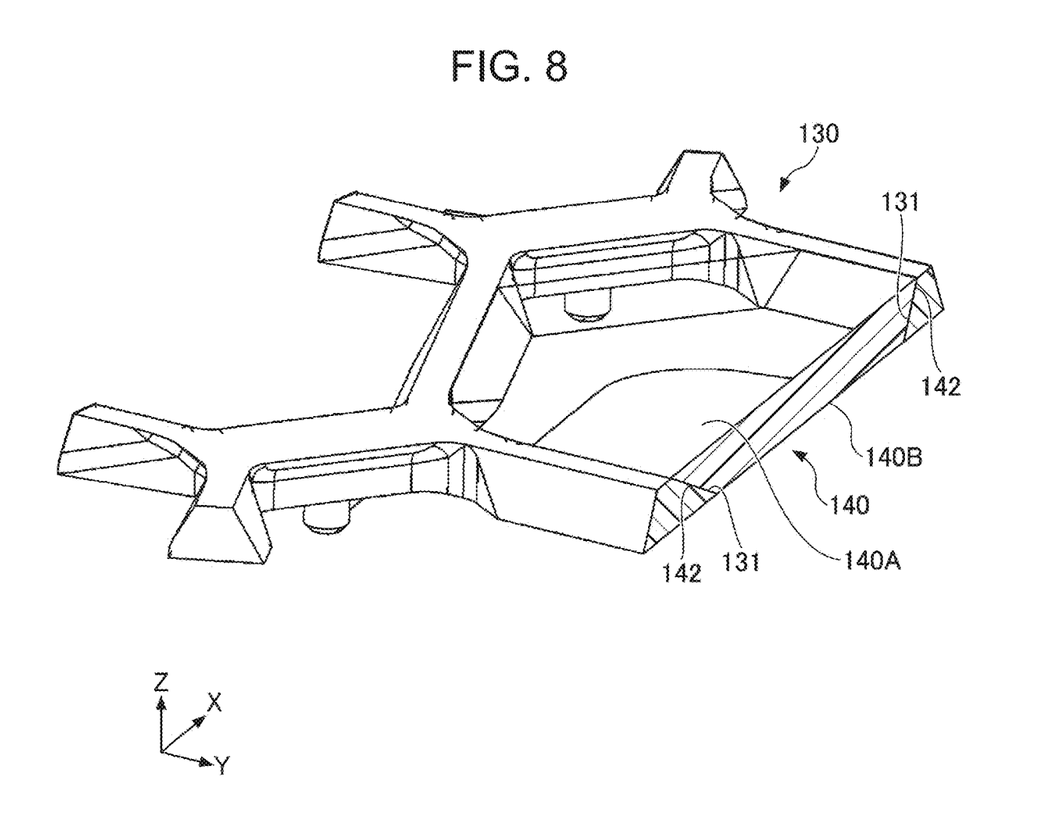
FIG. 8 is a cross-sectional perspective view of the light guide plate and the light shielding member provided in the input detection unit according to one embodiment, taken along a line VIII-VIII of FIG. 4.

FIG. 6 is a plan view of the light shielding member 130 provided in the input detection unit 100 according to one embodiment. FIG. 7 is a cross-sectional perspective view of the light guide plate 140 and the light shielding member 130 provided in the input detection unit 100 according to one embodiment, taken along a line VII-VII (refer to FIG. 4). FIG. 8 is a cross-sectional perspective view of the light guide plate 140 and the light shielding member 130 provided in the input detection unit 100 according to one embodiment, taken along a line VIII-VIII (refer to FIG. 4).

As illustrated in FIG. 5, the light guide plate 140 has a substantially hexagonal shape in plan view from above. Thus, the light guide plate 140 has an outer circumferential side surface consisting of six side surfaces. More specifically, the outer circumferential side surface of the light guide plate 140 consists of the two first side surfaces 141 and four second side surfaces 142.

As illustrated in FIG. 5, the two first side surfaces 141 face each other and are parallel to each other. Each of the first side surfaces 141 is disposed to face the LED 112 and serves as an incident plane on which the light emitted from the LED 112 is incident.

In addition, as illustrated in FIG. 5, two of the four second side surfaces 142 face each other, and the long side ridge lines of the second side surfaces 142 are parallel to each other. The other two of the four second side surfaces 142 face each other, and the long side ridge lines of the second side surfaces 142 are parallel to each other.

As illustrated in FIG. 6, the light shielding member 130 has a substantially hexagon frame shape in plan view from above. The substantially hexagonal shape of the light shielding member 130 is substantially the same as the substantially hexagonal shape of the light guide plate 140.

The light shielding member 130 has four light shielding walls 131 that extend along the four sides of the substantially hexagonal shape and that serve as inner wall surfaces exposed to the inside of the substantially hexagonal frame. Each of the light shielding walls 131 faces and contacts one of the second side surfaces 142 of the light guide plate 140. As a result, each of the light shielding walls 131 can prevent light leakage from the second side surface 142 of the light guide plate 140.

As illustrated in FIGS. 3 to 6, the light guide plate 140 and the light shielding member 130 have substantially the same shape as each other. Therefore, as illustrated in FIG. 4, by fitting the light guide plate 140 into the frame of the light shielding member 130 from above (in the positive direction of the Z-axis), the light guide plate 140 and the light shielding member 130 can be combined with each other and, thus, the light guide plate 140 can be held in the frame of the light shielding member 130.

As illustrated in FIGS. 7 and 8, when the light guide plate 140 and the light shielding member 130 are combined with each other, each of the four second side surfaces 142 of the light guide plate 140 is in contact with one of the four light shielding walls 131 of the light shielding member 130. This configuration prevents light leakage from each of the second side surfaces 142 of the light guide plate 140.

As illustrated in FIG. 5, since the light guide plate 140 has the substantially hexagonal shape in plan view from above, the first side surface 141 and the second side surface 142 of the light guide plate 140 form an obtuse angle.

This enables the input detection unit 100 according to one embodiment to easily spread light incident on the first side surface 141 of the light guide plate 140 over a wide area inside the light guide plate 140.

In the light guide plate 140, the first side surface 141 is perpendicular to the upper surface 140A and the lower surface 140B. That is, the first side surface 141 is perpendicular to the light emitted from the LED 112. This enables the input detection unit 100 according to one embodiment to increase the incident efficiency of the light that is emitted from the LED 112 and that is incident on the first side surface 141 of the light guide plate 140.

The second side surface 142 of the light guide plate 140 slopes to face downward. In contrast, the light shielding wall 131 of the light shielding member 130 slopes to face upward and has the same sloping angle as the second side surface 142 of the light guide plate 140.

This enables the input detection unit 100 according to one embodiment to increase the lower width of the light shielding wall 131 as compared with the case where the second side surface 142 and the light shielding wall 131 are vertical surfaces and, thus, the light shielding wall 131 can prevent light leakage more effectively.

In addition, the input detection unit 100 according to one embodiment can ensure a sufficient area of the upper surface 140A that serves as a light emitting surface, because each of the second side surfaces 142 of the light guide plate 140 slopes to face downward. As a result, the input detection unit 100 according to one embodiment can cause the operation surface 170A of the decorative panel 170 to emit light such that the luminance is uniform over a wide area of the operation surface 170A of the decorative panel 170.

The input detection unit 100 according to one embodiment can detect a non-contact operation performed on the operation surface 170A of the decorative panel 170 with high sensitivity using the electrostatic electrode 111 since the electrostatic electrode 111 (refer to FIG. 2) is provided directly below the light guide plate 140 (that is, directly below the central portion of the operation surface 170A of the decorative panel 170).

Therefore, according to the input detection unit 100 of one embodiment, light leakage from the light guide plate 140 in the lateral direction can be prevented and, thus, the detection accuracy of a non-contact operation performed on the operation surface 170A (an operation surface) of the decorative panel 170 can be improved, and the operation surface 170A of the decorative panel 170 can be made to emit light over a wide area with uniform light emission intensity.

As illustrated in FIGS. 7 and 8, in the input detection unit 100 according to one embodiment, the cross section of a frame portion of the light shielding member 130 having the light shielding wall 131 is trapezoidal and, thus, the strength of the frame portion of the light shielding member 130 can be increased.

According to the present embodiment, the light shielding member 130 is formed using a white resin. This enables the input detection unit 100 according to one embodiment to increase the reflection efficiency of light that leaks from the second side surface 142 of the light guide plate 140 due to the light shielding wall 131 of the light shielding member 130. Thus, the intensity of the light emitted from the upper surface 140A of the light guide plate 140 can be increased.

As illustrated in FIG. 5, the light guide plate 140 has protrusions 143 each protruding in the lateral direction from a second corner 145 between two neighboring second side surfaces 142. In addition, as illustrated in FIG. 6, the inner wall surface of the light shielding member 130 has fixing portions 134 each having a recessed shape that is recessed toward the outside of the frame at a position facing the protrusion 143 (that is, at the corner between two adjacent light shielding walls 131).

As a result, according to the input detection unit 100 of one embodiment, when the light guide plate 140 is fitted into the frame of the light shielding member 130, the protrusions 143 of the light guide plate 140 are fitted into the fixing portions 134 of the light shielding member 130 and, thus, the light guide plate 140 can be fixed such that the light guide plate 140 does not easily slip out of the frame of the light shielding member 130.

As illustrated in FIG. 5, the light guide plate 140 has four first corners 144 each formed by the first side surface 141 and the second side surface 142 that neighbor each other and the two second corners 145 each formed by the two second side surfaces 142 that neighbor each other. The four first corners 144 have the same angle. The protrusion 143 is provided at each of the second corners 145.

As a result, the input detection unit 100 according to one embodiment can spread the light incident on the inside of the light guide plate 140 through the pair of first side surfaces 141 of the light guide plate 140 uniformly over the entire area of the upper surface 140A of the light guide plate 140. In addition, the input detection unit 100 according to one embodiment can minimize the decrease in the amount of light caused by the affect of the protrusions 143, since the protrusions 143 are provided at the second corners 145.

As illustrated in FIG. 5, the width of the light guide plate 140 in a first direction which is the direction connecting the two first side surfaces 141 (the incident surfaces) is approximately equal to the width in a second direction which is the direction connecting the two protrusions 143. As illustrated in FIG. 6, the distance between two frame portions 132 of the light shielding member 130 (that is, the inner frame width in the first direction) is greater than the distance between the two fixing portion 134 (that is, the inner frame width in the second direction).

As a result, according to the input detection unit 100 of one embodiment, each of the two LEDs 112 can be disposed close to one of the two first side surfaces 141 (the incident surfaces) of the light guide plate 140 within the frame of the light shielding member 130.

The opening 151 of the light shielding sheet 150 has a substantially rectangular shape. One set of corners of the opening 151 of the light shielding sheet 150 faces the LEDs 112, and the other set of corners faces the fixing portions 134 of the light shielding member 130.

As a result, according to the input detection unit 100 of one embodiment, since the LED 112 and the fixing portion 134 of the light shielding member can be disposed outside of the corners of the opening 151 of the light shielding sheet 150 (on the extended diagonal lines), the width of the frame portion around the opening 151 of the light shielding sheet 150 can be reduced.

Arrangement of LEDs

Figure 9:
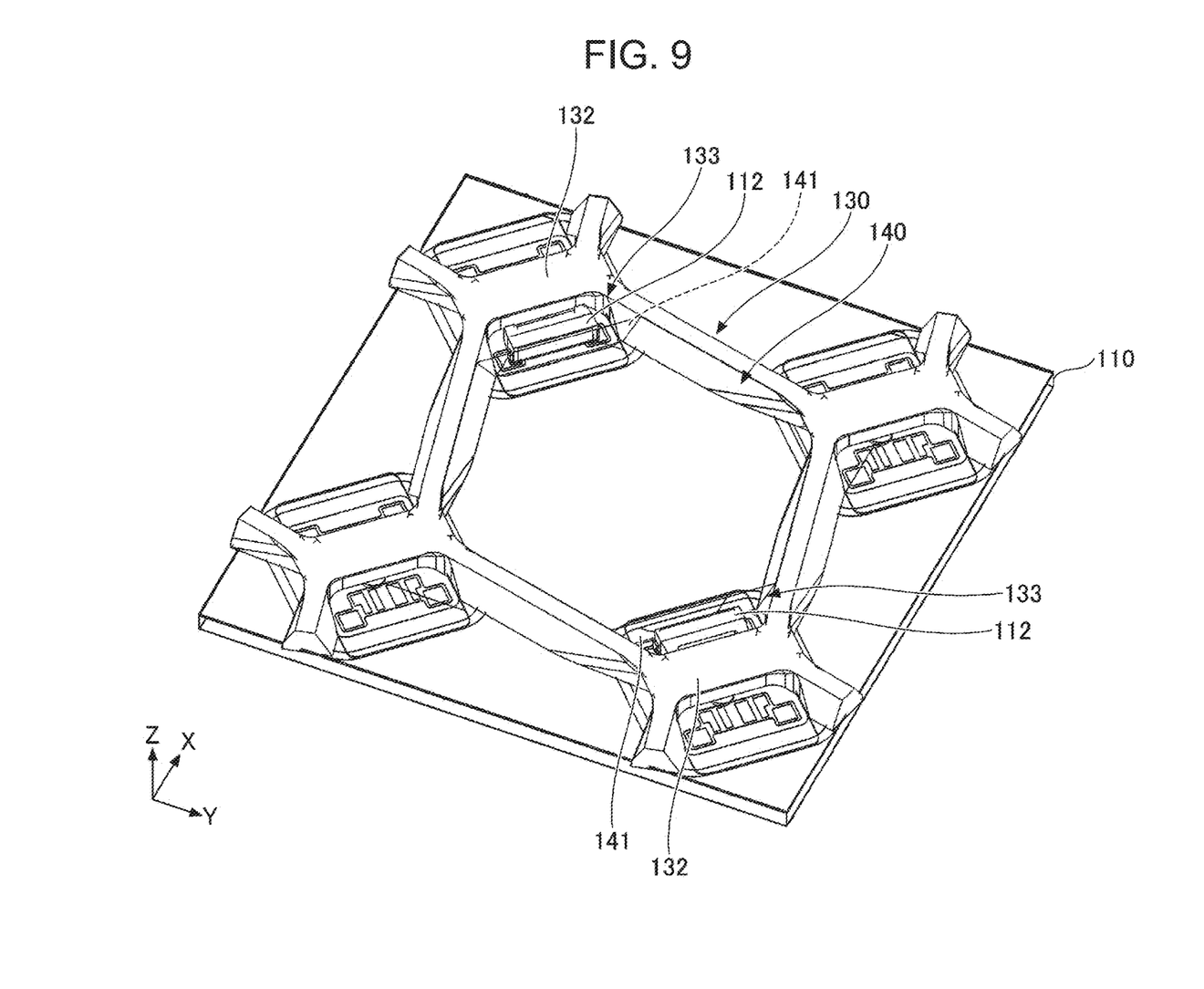
FIG. 9 illustrates the arrangement of LEDs in the input detection unit according to one embodiment.

FIG. 9 illustrates the arrangement of the LED 112 in the input detection unit 100 according to one embodiment. As illustrated in FIG. 9, the substantially hexagonal shape formed by the light shielding member 130 is obtained by expanding the substantially hexagonal shape formed by the light guide plate 140 in the diagonal direction passing through the pair of LEDs 112. As a result, a space 133 is formed between the frame portion 132 of the light shielding member 130 and the first side surface 141 of the light guide plate 140, which face each other.

As a result, according to the input detection unit 100 of one embodiment, the LED 112 can be disposed in the space 133 between the frame portion 132 of the light shielding member 130 and the first side surface 141 of the light guide plate 140. That is, according to the input detection unit 100 of one embodiment, the LED 112 can be disposed close to the first side surface 141 of the light guide plate 140.

Configuration of Lower Surface of Light Guide Plate

Figure 10:
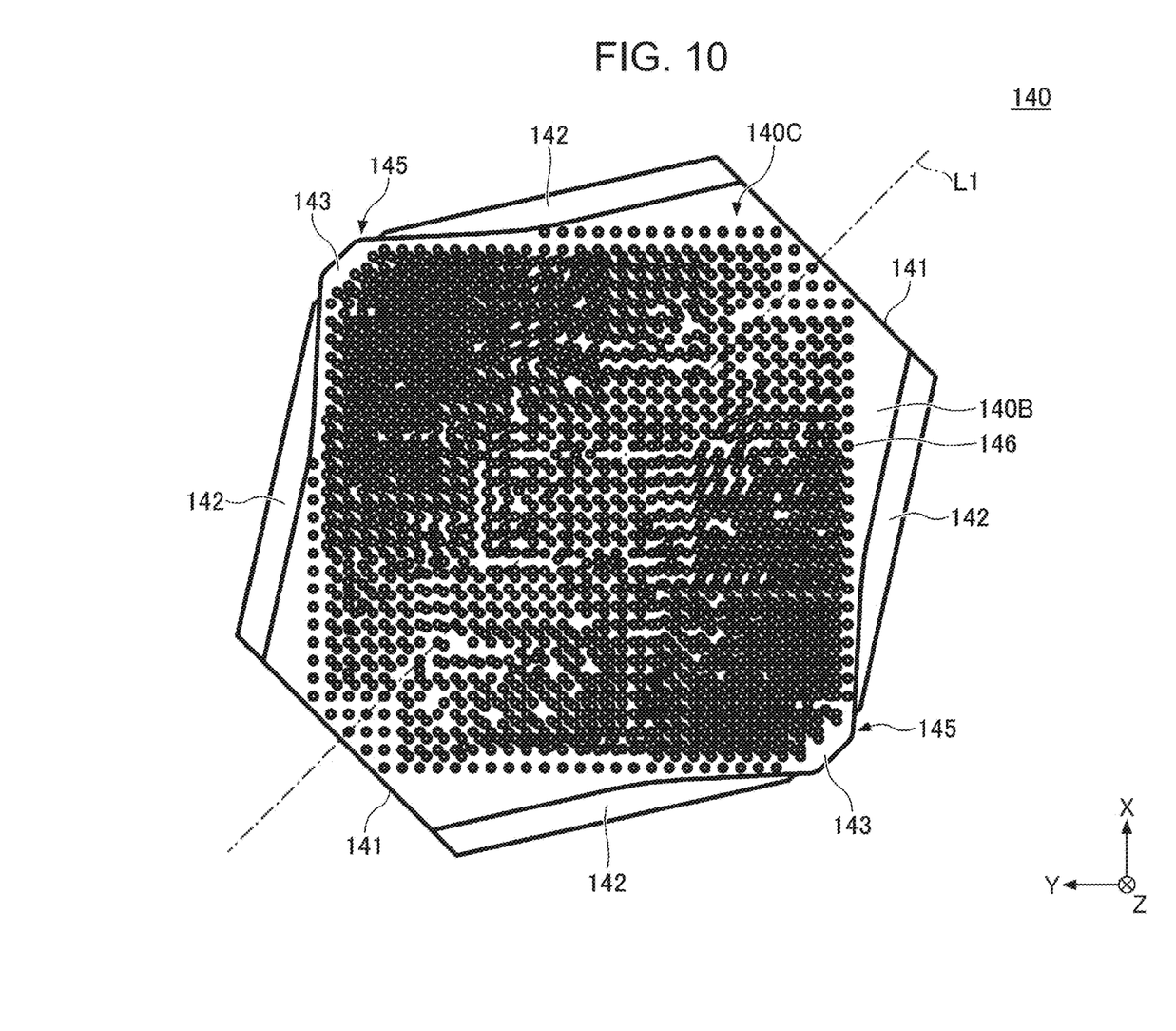
FIG. 10 is a bottom view of the light guide plate provided in the input detection unit according to one embodiment.

FIG. 10 is a bottom view of the light guide plate 140 provided in the input detection unit 100 according to one embodiment. As illustrated in FIG. 10, the lower surface 140B of the light guide plate 140 has a rectangular diffusion area 140C that overlaps the opening 151 of the light shielding sheet 150, and a plurality of irregularities 146 are formed in the diffusion area 140C to diffuse light.

As illustrated in FIG. 10, in the diffusion area 140C, the density of the irregularities 146 is low in the vicinity of a line segment L1 connecting the midpoints of the two first side surfaces 141, so that a smaller amount of light can be diffused. In contrast, the density of the irregularities 146 is high in the vicinity of the second corner 145 where the protrusion 143 is provided, so that a larger amount of light can be diffused.

As a result, according to the input detection unit 100 of one embodiment, a rectangular area of the upper surface 140A of the light guide plate 140 that overlaps the opening 151 of the light shielding sheet 150 can be made to emit light with uniform light emission intensity. Thus, the input detection unit 100 according to one embodiment can cause the rectangular-shaped light-emitting area on the operation surface 170A of the decorative panel 170 to emit light with uniform light emission intensity.

Configuration of Input Device

Figure 11:
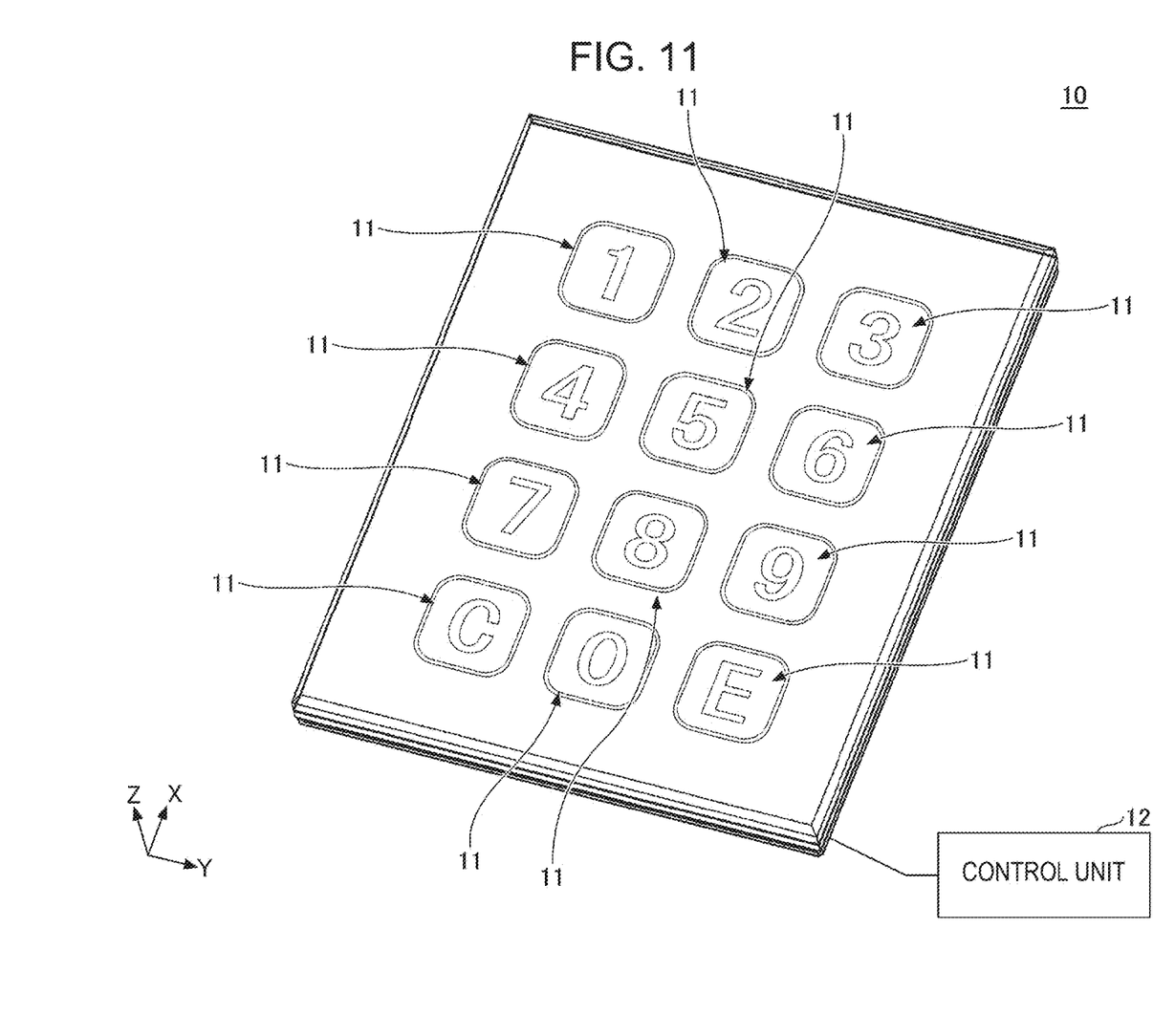
FIG. 11 an external perspective view of an input device according to one embodiment.
Figure 12:
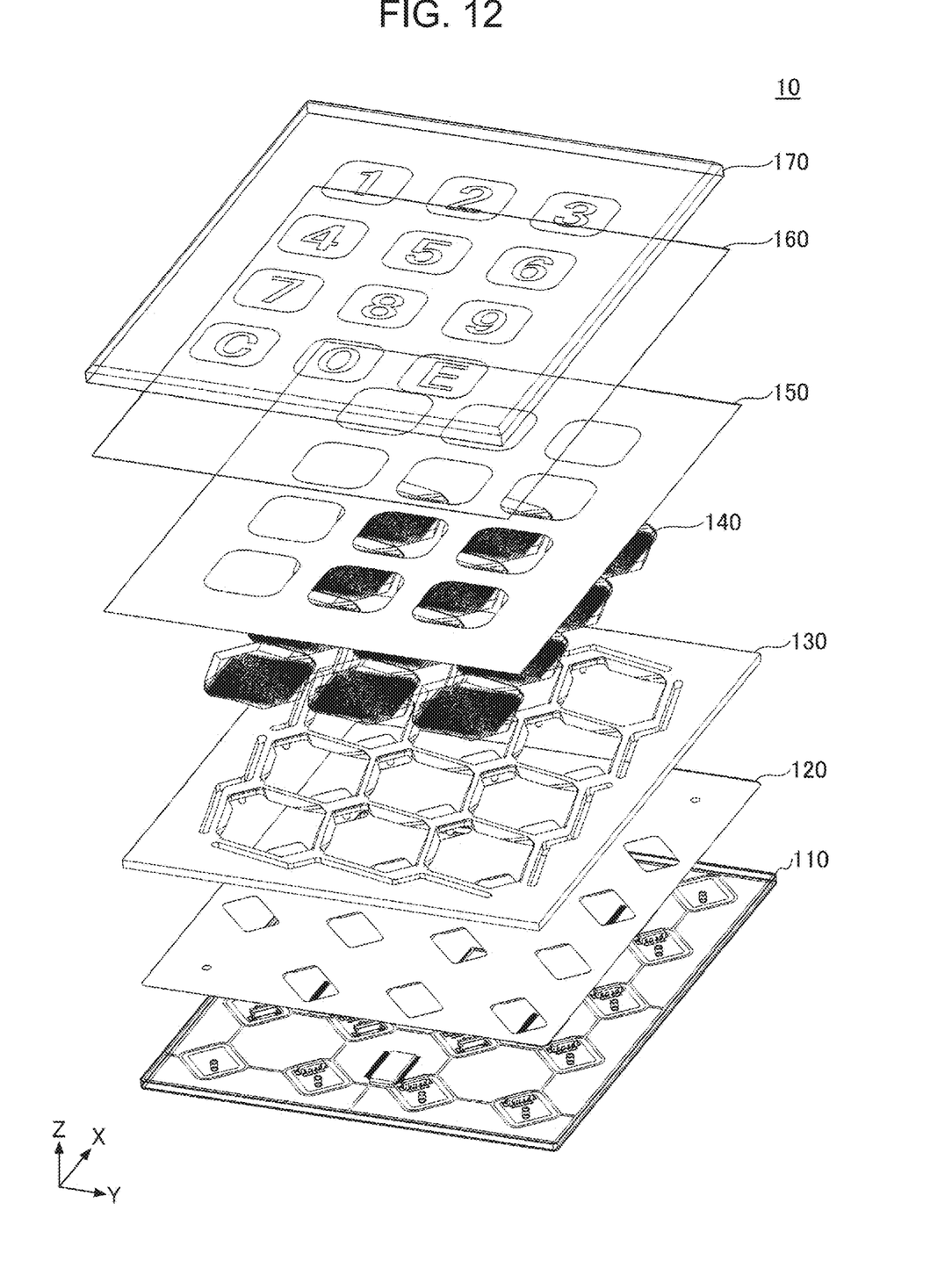
FIG. 12 is an exploded perspective view of the input device according to one embodiment.

FIG. 11 is an external perspective view of the input device 10 according to one embodiment. FIG. 12 is an exploded perspective view of the input device 10 according to one embodiment.

As illustrated in FIGS. 11 and 12, the input device 10 has the plurality of operation keys 11 arranged side-by-side on a flat surface. In an example illustrated in FIGS. 11 and 12, the input device 10 has 12 operation keys 11 arranged in a matrix of three columns by four rows.

The input device 10 includes the input detection unit 100 described with reference to FIGS. 1 to 10 for each of the operation keys 11. However, in the input device 10, the constituent parts common to the plurality of input detection units 100 are integrally formed into a single constituent part. That is, in the input device 10, a plurality of constituent parts each for one operation key 11 (for one input detection unit 100) are integrated for one constituent part.

More specifically, as illustrated in FIG. 12, the input device 10 includes, in order from the bottom in FIG. 12 (from the Z-axis negative side), the circuit board 110, the reflective sheet 120, the light shielding member 130, the light guide plate 140, the light shielding sheet 150, the diffusion sheet 160, and the decorative panel 170.

The circuit board 110 is formed by integrating the plurality of circuit boards 110 provided in the plurality of operation keys 11 (the plurality of input detection units 100) into the single circuit board 110. The individual configuration of the circuit board 110 for each of the operation keys 11 is the same as the configuration of the circuit board 110 provided in the input detection unit 100 described with reference to FIGS. 1 to 10.

The reflective sheet 120 is formed by integrating the plurality of reflective sheets 120 provided in the plurality of operation keys 11 (the plurality of input detection units 100) into the single reflective sheet 120. The individual configuration of the reflective sheet 120 for each of the operation keys 11 is the same as the configuration of the reflective sheet 120 provided in the input detection unit 100 described with reference to FIGS. 1 to 10.

The light shielding member 130 is formed by integrating the light shielding members 130 provided in the plurality of operation keys 11 (the plurality of input detection units 100) into the single light shielding member 130. The individual configuration of the light shielding member 130 for each of the operation keys 11 is the same as the configuration of the light shielding member 130 provided in the input detection unit 100 described with reference to FIGS. 1 to 10.

The light shielding sheet 150 is formed by integrating the light shielding sheets 150 provided in the plurality of operation keys 11 (the plurality of input detection units 100) into the single light shielding sheet 150. The individual configuration of the light shielding sheet 150 for each of the operation keys 11 is the same as the configuration of the light shielding sheet 150 provided in the input detection unit 100 described with reference to FIGS. 1 to 10.

The diffusion sheet 160 is formed by integrating the plurality of diffusion sheets 160 provided in the plurality of operation keys 11 (the plurality of input detection units 100) into the single diffusion sheet 160. The individual configuration of the diffusion sheet 160 for each of the operation keys 11 is the same as the configuration of the diffusion sheet 160 provided in the input detection unit 100 described with reference to FIGS. 1 to 10.

The decorative panel 170 is formed by integrating the plurality of the decorative panels 170 provided in the plurality of operation keys 11 (the plurality of input detection units 100) into the single decorative panel 170. The individual configuration of the decorative panel 170 for each of the operation keys 11 is the same as the configuration of the decorative panel 170 provided by the input detection unit 100 described using FIGS. 1 to 10.

In the input device 10, the arrangement configuration of the plurality of constituent members is not limited to that illustrated in FIG. 12. For example, in the input device 10, the light shielding sheet 150 can be overlaid on the upper side with respect to the diffusion sheet 160. In addition, for example, in the input device 10, if the decorative light shielding property of the decorative panel 170 is sufficient, a configuration that does not include the light shielding sheet 150 can be employed.

As illustrated in FIG. 11, the input device 10 includes a control unit 12. The input device 10 can control the light emission of each of the plurality of operation keys 11 by using the control unit 12. The control unit 12 may be provided on the circuit board 110 or may be provided outside of the circuit board 110 and be connected via, for example, a connection cable.

The input device 10 according to one embodiment can obtain the effects of the input detection units 100 in the plurality of operation keys 11, since each of the plurality of operation keys 11 includes the input detection unit 100 described with reference to FIGS. 1 to 10.

That is, in the input device 10 according to one embodiment, each of the plurality of operation keys 11 can reduce light leakage from the light guide plate 140 in the lateral direction (that is, light leakage to the neighboring operation key 11). In addition, the input device 10 can increase the detection accuracy of a non-contact operation performed on the operation surface 170A of the decorative panel 170, and can cause the operation surface 170A of the decorative panel 170 to emit light with uniform light emission intensity over a wide area.

Example of Light Emission Control Performed by Control Unit

Figure 13:
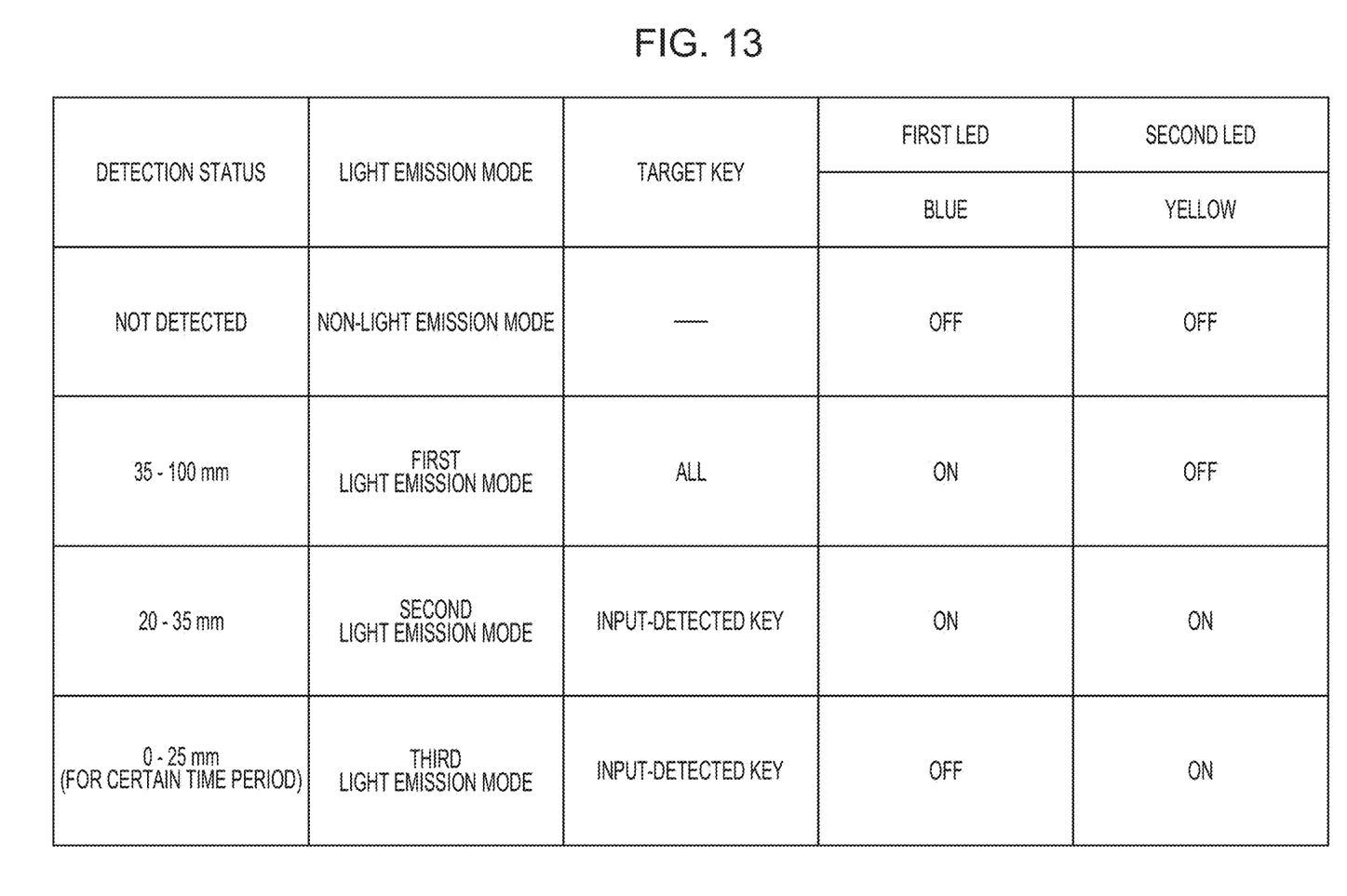
FIG. 13 illustrates an example of light emission control performed by a control unit provided in the input device according to one embodiment.

FIG. 13 illustrates an example of light emission control performed by the control unit 12 provided in the input device 10 according to one embodiment.

The input device 10 includes a pair of LEDs 112 for each of the operation keys 11, and the two LEDs 112 emit light of different colors. As an example, one of the two LEDs 112 emits blue light, and the other emits yellow light.

As illustrated in FIG. 13, the control unit 12 can control the light emission mode of each of the operation keys 11 to one of first, second, and third light emission modes in accordance with the near distance between the operation surface 170A and an operating body (for example, the operator's finger) detected by the electrostatic electrode 111.

In the first light emission mode, the control unit 12 causes one of the LEDs 112 to emit light (that is, blue light) for all the operation keys 11 when the above-described near distance is 35 mm to 100 mm.

In the second light emission mode, the control unit 12 causes the two LEDs 112 to emit light (that is, blue light and yellow light) and, thus, light of a color close to white for the operation key 11 for which non-contact operation is detected when the above-described near distance is 20 to 35 mm.

In the third light emission mode, the control unit 12 causes only the other LED 112 to emit light (that is, yellow light) for the operation key 11 for which non-contact operation is detected when the above-described distance of 0 to 25 mm is maintained for a certain time period (that is, when a non-contact operation is determined).

As described above, the input device 10 according to one embodiment can help the operator easily visually identify the non-contact operation state by controlling the emission color of each of the operation keys 11 in accordance with the above-described near distance.

In the second light emission mode, the control unit 12 may control the two LEDs 112 such that, for example, the luminance of the other LED 112 (that is, yellow light) is gradually increased and, thus, light that gradually turns white is emitted in accordance with the above-described near distance.

The LED 112 is not limited to that capable of emitting light of a single color, but may be capable of emitting light in multiple colors (for example, three colors). In this case, the LED 112 can emit light in a variety of colors by combining light in multiple colors.

While embodiments of the present invention have been described in detail above, the present invention is not limited to these embodiments, and various modifications or changes can be made within the scope of the invention as described in the appended claims.

For example, the number and arrangement of the operation keys 11 in the input device 10 are not limited to those illustrated in FIG. 11. The input device 10 may have only one operation key 11 (that is, only one input detection unit 100).

What is claimed is:
1. An input device comprising:
 an input detection unit, including:
  an operation surface;
  a circuit board;

an electrostatic electrode disposed on the circuit board and configured to detect electrostatic capacitance;

at least one light source disposed on the circuit board;

a light guide plate provided below the operation surface and above the electrostatic electrode, the light guide plate having an upper surface, a lower surface, at least one first side surface facing the at least one light source, and at least one second side surface not facing the at least one light source, the first side surface and the second side surface adjacent to each other forming an obtuse angle; and a light shielding member having a frame shape surrounding the light guide plate, the light shielding member having a light shielding wall, wherein the at least one first side surface of the light guide plate is perpendicular to the upper surface and the lower surface of the light guide plate, while the at least one second side surface of the light guide plate is inclined to face downward, and wherein the light shielding wall of the light shielding member is inclined to face upward and in contact with the at least one second side surface of the light guide plate.

2. The input device according to claim 1, wherein the light guide plate has at least one protrusion protruding in a lateral direction, and wherein the light shielding member has at least one fixing portion facing the at least one protrusion such that the protrusion is fitted into the fixing portion, thereby fixing the light guide plate.

3. The input device according to claim 2, wherein the at least one light source comprises a pair of light sources, wherein the light guide plate has a substantially hexagonal shape in plan view from above, the at least one first side surface including a pair of first side surfaces opposite to each other, and the at least one second side surface including two pairs of second side surfaces opposite to each other, whereby the light guide plate has four first corners each formed by one of the first side surfaces and one of the second side surfaces adjacent to each other and two second corners each formed by two of the second side surfaces adjacent to each other, and wherein each of the pair of first side surfaces faces corresponding one of the pair of light sources, the four first corners have a same angle, and the protrusion is provided at each of the two second corners.

4. The input device according to claim 3, wherein the input detection unit further includes a light shielding sheet overlaid on the light guide plate, the light shielding sheet having an opening from which the upper surface of the light guide plate is exposed, wherein the light shielding wall of the light shielding member is formed of a white resin, wherein the light guide plate is provided with irregularities formed in an area of the lower surface overlapping the opening of the light shielding sheet, a density of the irregularities in a vicinity of a line extending through a respective midpoint of each of the pair of first side surfaces is lower than a density of the irregularities in a vicinity of the two second corners.

5. The input device according to claim 2, wherein the at least one first side surface of the light guide plate includes a pair of first side surfaces opposite to each other in a first direction, and the at least one protrusion includes a pair of protrusions provided on opposite sides of the light guide plate in a second direction perpendicular to the first direction, the light guide plate having a width in the first direction substantially the same as a width in the second direction, and wherein an inner frame width of the light shielding member in the first direction is greater than an inner frame width of the light shielding member in the second direction.

6. The input device according to claim 4, wherein the input detection unit further includes:

a reflective sheet disposed between the circuit board and the light guide plate, the reflective sheet having an opening at a position overlapping each of the pair of light sources;

a diffusion sheet overlaid on the light shielding sheet; and a decorative panel overlaid on the diffusion sheet, the decorative panel having a light shielding portion of a predetermined designed shape, and wherein the opening of the light shielding sheet has a substantially rectangular shape, with a pair of opposite corners thereof facing the pair of light sources, while another pair of opposing corners facing the fixing portions of the light shielding member.

7. The input device according to claim 6, wherein the pair of light sources include a first light source and a second light source which have different emission colors, the input device further comprising:

a control unit configured to control the pair of light sources to enter one of: a first light emission mode in which only the first light source emits light, a second light emission mode in which both of the first and second light sources emit light, and a third light emission mode in which only the second light source emits light, based on a distance between the operation surface and an operation body detected by the electrostatic electrode.

8. The input device according to claim 1, further comprising:

a plurality of operation keys arranged on a flat surface; and a plurality of the input detection units, each provided for corresponding one of the plurality of operation keys.

* * * * *